(12) United States Patent
Yao et al.

(10) Patent No.: US 11,547,991 B2
(45) Date of Patent: Jan. 10, 2023

(54) CATALYST ACTIVATION FOR SELECTIVE HYDROGENATION OF CONTAMINANTS IN A LIGHT OLEFIN STREAM

(71) Applicant: PHILLIPS 66 COMPANY, Houston, TX (US)

(72) Inventors: Jianhua Yao, Bartlesville, OK (US); Daniel Kuehler, Tulsa, OK (US)

(73) Assignee: Phillips 66 Company, Houston, TX (US)

(*) Notice: Subject to any disclaimer, the term of this patent is extended or adjusted under 35 U.S.C. 154(b) by 0 days.

(21) Appl. No.: 17/538,503

(22) Filed: Nov. 30, 2021

(65) Prior Publication Data

US 2022/0168724 A1    Jun. 2, 2022

Related U.S. Application Data

(60) Provisional application No. 63/119,051, filed on Nov. 30, 2020, provisional application No. 63/119,057, filed on Nov. 30, 2020.

(51) Int. Cl.
*B01J 37/18* (2006.01)
*B01J 23/755* (2006.01)
*B01J 37/08* (2006.01)
*B01J 21/08* (2006.01)
*B01J 21/06* (2006.01)
(Continued)

(52) U.S. Cl.
CPC .......... *B01J 37/18* (2013.01); *B01J 21/066* (2013.01); *B01J 21/08* (2013.01); *B01J 23/755* (2013.01); *B01J 37/08* (2013.01); *C10G 9/00* (2013.01); *C10G 50/00* (2013.01); *C10L 1/04* (2013.01);
(Continued)

(58) Field of Classification Search
CPC . B01J 21/066; B01J 21/08; B01J 21/12; B01J 23/755; B01J 37/08; B01J 37/088; B01J 37/18; B01J 37/20; C10G 9/00; C10G 45/36; C10G 50/00; C10G 69/126;
(Continued)

(56) References Cited

U.S. PATENT DOCUMENTS 5,008,235 A * 4/1991 Wegman ................. B01J 23/80
502/341

OTHER PUBLICATIONS

Machine Translation of Ji et al, CN 110354913, published Oct. 2019.*

(Continued)

*Primary Examiner* — Brian A McCaig
(74) *Attorney, Agent, or Firm* — Phillips 66 Company (57) ABSTRACT

A process for activating a hydrogenation catalyst comprising nickel to produce a selective hydrogenation catalyst, comprising contacting the hydrogenation catalyst with a mixed gas comprising and hydrogen sulfide and periodically increasing the temperature of the mixed gas in increments until the mixed gas reaches a temperature that facilities the efficient catalytic hydrogenation of both acetylene and butadiene by the modified catalyst, while the modified catalyst is simultaneously characterized by low selectivity for the hydrogenation of ethylene. The disclosure further claims a process that utilizes the modified catalyst to selectively hydrogenate acetylene and butadiene contaminants in a raw light olefin stream produced by thermal cracking, thereby extending the useful catalytic lifespan of a downstream oligomerization catalyst that converts the light olefins stream to a liquid transportation fuel, or a blend stock thereof.

16 Claims, 8 Drawing Sheets

(51) Int. Cl.
*C10G 9/00* (2006.01)
*C10L 1/04* (2006.01)
*C10G 50/00* (2006.01)

(52) U.S. Cl.
CPC ... *C10L 2200/0461* (2013.01); *C10L 2290/02* (2013.01); *C10L 2290/54* (2013.01)

(58) Field of Classification Search
CPC .............. C10G 2300/703; C10L 1/04; C10L 2200/0461; C10L 2290/02; C10L 2290/54
See application file for complete search history.

(56) References Cited

OTHER PUBLICATIONS

Viveros-Garcia, T., 1985, Adsorption of Sulphur Compounds on Nickel Catalysts: Poisoning and Regeration Studies, PhD Dissertation, Department of Chemical Engineering and Chemical Technology, Imperical College of Science and Technology, 337 pp.*

* cited by examiner

CATALYST ACTIVATION FOR SELECTIVE HYDROGENATION OF CONTAMINANTS IN A LIGHT OLEFIN STREAM

STATEMENT REGARDING FEDERALLY SPONSORED RESEARCH OR DEVELOPMENT

This application is a non-provisional application, which claims the benefit of and priority to U.S. Provisional Application Ser. No. 63/119,051 filed Nov. 30, 2020, entitled "Catalyst Activation for Selective Hydrogenation of Contaminants in a Light Olefin Stream" and U.S. Provisional Application Ser. No. 63/119,057, entitled "Selective Hydrogenation of Contaminants in a Light Olefin Stream", both of which are hereby incorporated by reference in its entirety.

FIELD OF THE INVENTION

This invention relates to the conversion of ethane to liquid fuels and chemicals.

BACKGROUND OF THE INVENTION

In recent years, an abundance of shale gas discoveries in the United States has resulted in a significant increase in natural gas production as well as natural gas liquid production. This increased level of production is expected to continue for the foreseeable future. The industry currently produces an over-abundance of the lighter components of NGLs (e.g., ethane and propane). As a result, processes have been developed to convert these light alkanes into larger hydrocarbons that are useful as liquid transportation fuels or a blend component thereof. Some of these processes involve cracking the light alkanes to produce olefins that can be catalytically oligomerized to produce larger hydrocarbon products.

However, such processes have been associated with drawbacks that have prevented commercial implementation. Among these is deactivation of zeolite oligomerization catalysts by contaminants present in cracked ethane streams (or cracked Y-Grade streams). Among the most consequential are acetylene and butadiene. These compounds cause rapid coking of zeolite oligomerization catalysts by binding to their Brønsted acid sites, leading to their complete deactivation after just a few hours.

Supported nickel hydrogenation catalysts have been described that can remove a portion of these contaminants and have catalytic activity that is resistant to the presence of hydrogen sulfide, carbon monoxide and water. Yet, these nickel catalysts also have limitations, particularly in their inability to efficiently hydrogenate most of the butadiene in a cracked light olefin stream. Other catalysts may efficiently hydrogenate both butadiene and acetylene, but lack selectivity towards these compounds, resulting in excessive hydrogenation (and consequent loss) of ethylene in the oligomerization feed stream. What is needed is a hydrogenation catalyst that can efficiently and selectively remove more than 90 vol % of both acetylene and butadiene form a cracked ethane stream (or cracked Y-grade stream) while having low selectivity towards the hydrogenation of ethylene (e.g., less than 3 vol %).

BRIEF SUMMARY OF THE DISCLOSURE

Certain embodiments of the present inventive disclosure relate to a process to activate a hydrogenation catalyst to produce a selective hydrogenation catalyst, comprising: a) contacting a hydrogenation catalyst comprising nickel with a mixed gas comprising hydrogen and hydrogen sulfide at a first temperature that is in the range from 0° C. to 50° C. in a first reaction zone, then raising the temperature of the mixed gas in the first reaction zone until a second temperature is reached that is greater than the first temperature; b) continuing the contacting of the hydrogenation catalyst with the mixed gas at the second temperature for at least 1 hr, then increasing the temperature of the mixed gas in multiple subsequent increments, wherein each increase in temperature produces a new temperature that is at least 25° C. greater than the temperature immediately prior, and each new temperature is maintained for at least 1 hr before the next increase in temperature of the mixed gas, wherein the process produces a modified hydrogenation catalyst that is characterized by an increased selectivity for the hydrogenation for both acetylene and butadiene and a decreased selectivity for the hydrogenation of ethylene.

In certain embodiments, the modified hydrogenation catalyst comprises nickel supported on silica or zirconia. In certain embodiments, the modified hydrogenation catalyst comprises nickel at a loading that is in a range from 0.5 wt. % to 3 wt. %.

In certain embodiments, the hydrogen sulfide is present at a concentration that is in a range from 10 ppm to 1000 ppm in the mixed gas; Optionally, the hydrogen sulfide is present at a concentration of at least 100 ppm in the mixed gas. In certain embodiments, the mixed gas further comprises at least 35 vol. % hydrogen, at least 50 vol. % C1-C3 olefins and C1-C3 alkanes and at least 50 ppm of carbon monoxide.

In certain embodiments, the mixed gas flows through the reaction zone at a flow rate of at least 0.5 $hr^{-1}$ (WHSV). Optionally, the flow rate is at least 1 $hr^{-1}$ (WHSV) or may be 2 $hr^{-1}$ (WHSV). In certain embodiments, the maximum temperature of the mixed gas during the contacting does not exceed 350° C.

In certain embodiments, each increase in temperature produces a new temperature that is at least 25° C. greater than the temperature immediately prior.

In certain embodiments, during the contacting, the mixed gas is maintained for at least one hour at a quantity of different temperatures that is in a range from four to twelve; Optionally, the mixed gas is maintained at each different temperature for at least 10 hours.

Certain embodiments comprise a modified hydrogenation catalyst produced by the inventive process described herein. In certain embodiments, the modified hydrogenation catalyst is characterized by an increased selectivity for the hydrogenation for both acetylene and butadiene, and hydrogenates at least 90 vol. % of both acetylene and butadiene at a temperature of at least 170° C. when contacted with a mixed gas comprising 0.5 vol. % acetylene and 0.5 vol. % butadiene and 35.5 vol. % ethylene at a flow rate of 1.0 $hr^{-1}$ WHSV, wherein the modified hydrogenation catalyst is further characterized by a decreased selectivity for the hydrogenation of ethylene and hydrogenates less than 3 wt. % of ethylene in the mixed gas a temperature of at least 170° C.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

The inventive processes disclosed herein include a thermal-activation (i.e., thermal cracking) step to generate a raw light olefins stream comprising hydrogen, methane, acetylene, ethylene, ethane, propylene, propane, butadiene, butenes, butanes, and a minor amount of C5+. This step is followed by a zeolite-catalyzed conversion step that converts the raw light olefins stream to larger hydrocarbons that may be used as a liquid transportation fuel, or a blend component of a liquid transportation fuel. A significant challenge to commercializing such a process is that the thermal-cracking of light hydrocarbon feed streams produces significant quantities of acetylene and butadiene that can negatively affect the lifespan of a zeolite catalyst that is used to upgrade (e.g., by oligomerization) the raw light olefin stream. This is particularly true for a process that converts a Y-grade NGL fraction to liquid transportation fuels, due to the higher quantity of butadiene created by thermally-cracking a Y-grade feed stream. In this disclosure, the term Y-grade is used to represent a common term for an NGL fraction that predominantly includes C2-C7 alkanes and olefins.

The acetylene and butadiene produced during thermal cracking of a light alkanes stream can negatively affect the lifespan of any catalysts used to upgrade the raw cracked light olefins stream. For example, a ZSM-5 catalyst used to oligomerize such a stream has its usable catalytic lifetime (or cycle length) reduced by about 30-50% in the presence of ~0.5 vol % butadiene in the raw light olefins stream. Table II clearly shows that dienes exist in greater amounts in a raw light olefins stream derived from the thermal cracking of a Y-grade hydrocarbon stream compared to a raw ethylene stream derived from the thermal cracking of ethane. A higher dienes level can lead to significant reduction of catalyst lifetime (cycle length) and make a preferred fixed-bed operation for this conversion step impossible.

Consequently, removal of dienes becomes necessary to achieve reasonable ZSM-5 catalyst lifespan. Thus, the present inventive process relates to an improved catalyst and catalyst activation process) for selectively removing acetylene and butadiene from raw light olefins stream.

Selective hydrogenation of acetylene and butadiene in a mixed olefins stream has been studied and implemented in many conventional steam cracking processes that produce high-purity ethylene for the plastics industry. For these conventional processes, a Ni-based catalyst is typically used to remove the acetylene and butadiene from the raw olefins stream produced by steam cracking. These nickel catalysts were tolerant to the presence of CO and H$_2$S in the cracked ethylene stream, but unfortunately also hydrogenated a significant percentage of valuable ethylene under conditions required to simultaneously remove >99.9% of acetylene and butadiene. Removal of nearly all acetylene and butadiene is required for such processes in order to produce polymer-grade ethylene with 99.98% ethylene purity.

The undesirable lack of specificity of these nickel catalysts (leading to loss of ethylene) led to the more recent development of palladium (Pd) based catalysts that are widely used in newer steam cracker ethylene production processes. This Pd-based catalyst significantly improves hydrogenation selectivity toward acetylene and minimizes loss of ethylene. However, as expected, such catalysts are sensitive to impurities in the raw light olefins stream (e.g., H$_2$S and CO) and can only be utilized to make polymer-grade ethylene once such contaminants are removed.

For the present inventive processes, the requirements for acetylene and butadiene removal are far less stringent than required for conventional processes that crack an ethane stream and then polymerize the cracked stream to make plastics and other chemicals. We determined that substantial improvements in the overall catalytic lifespan of zeolite oligomerization catalysts is observed when only about 90 wt % to 95 wt % of both acetylene and butadiene are removed from a raw olefin stream prior to upgrading the stream by zeolite-mediated oligomerization.

Thus, we sought to identify a selective hydrogenation catalyst characterized by a catalytic selectivity to remove at least 90 wt % of both acetylene and butadiene from a raw olefin stream while simultaneously hydrogenating less than 3 wt % of the ethylene in the raw olefin stream (since ethylene is the primary product oligomerized in the oligomerization reactor to produce liquid transportation fuel or blend component thereof). We also sought a catalyst having catalytic activity that was relatively resistant to deactivation by contaminants such as H$_2$S and CO. In certain embodiments, the selective hydrogenation catalyst would remove at least 90 wt % of both acetylene and butadiene from a raw olefin stream while simultaneously hydrogenating less than 2 wt % of the ethylene in the raw olefin stream. Optimally, the selective hydrogenation catalyst would remove at least 90 wt % of both acetylene and butadiene from a raw olefin stream while simultaneously hydrogenating less than 1 wt % of the ethylene in the raw olefin stream. With this level of selectivity, it was determined that loss of ethylene from the stream would not be economically significant.

Various nickel-supported catalysts were tested to catalytically remove acetylene and butadiene from a raw light olefins stream due to the tolerance of nickel to the presence of hydrogen sulfide ($H_2S$), carbon monoxide (CO), and carbon dioxide ($CO_2$), among other compounds, in a raw light olefins stream. Nickel catalysts have been previously used to hydrogenate acetylene, but with only limited success for removing butadiene at a temperature that does not simultaneously hydrogenate a significant percentage of ethylene in the raw light olefin stream.

We first evaluated a nickel catalyst supported on alumina ($Ni/Al_2O_3$) and tested different activation processes to see if activity of the catalyst was dependent on the method utilized for catalyst activation. The $Ni/Al_2O_3$ catalyst was prepared by impregnating an $Al_2O_3$ support with $Ni(NO_3)_2$ solution followed by drying at 120° C. overnight and then calcination at 300° C. for 6 h.

The resulting catalyst was evaluated for the selective hydrogenation of acetylene and butadiene in the presence of hydrogen, CO, and $H_2S$. The reaction was carried out in a quartz-lined stainless-steel reactor with 3.0 g of the catalyst. The reactor was placed in a vertical clamshell furnace equipped with a temperature controller. The mixed gas, containing 39 vol % hydrogen, 35.5 vol % ethylene, 24.5 vol % ethane, 0.5 vol % acetylene, 0.5 vol % butadiene, 50 ppm CO, and 100 ppm $H_2S$, was fed to the reactor at 50 psig and a volumetric flow rate of 1.0 $hr^{-1}$ (based on the volume of ethylene) and at temperatures ranging from ~100 to ~350° C. The reactor off-gas was analyzed by using an on-line Wasson-ECE Instrumentation refinery gas analyzer.

Four different start-up procedures, listed below, were used in this catalyst evaluation. Typically, such hydrogenation catalysts are reduced in the presence of hydrogen prior to beginning the hydrogenation reaction by contacting the catalyst with a mixed gas comprising acetylene and butadiene. However, during our experiments, we inadvertently contacted the catalyst with the mixed gas at an initial temperature that was too low to facilitate efficient hydrogenation activity. The temperature of the mixed gas was then raised by one of three different methods (i.e., rapid ramp, slow ramp, or intermittent increase). Catalyst performance was then compared for acetylene, butadiene, and ethylene conversion at 250° C. and 300° C.

Hydrogen pre-reduction: The catalyst was reduced in hydrogen gas at 300° C. for 2 h prior to contacting with the mixed gas for catalyst evaluation.

Rapid-temperature-ramping rate: The catalyst bed temperature was quickly increased to 300° C. at a rate of +5° C./min while the mixed gas was passing through the catalyst bed.

Slow-temperature-ramping rate: The catalyst bed temperature was brought to 250° C. at a 0.5° C./min rate while the mixed gas was passing through the catalyst bed.

Intermittent temperature increase: The catalyst bed temperature was initially maintained at 100° C. for 10 hours while the mixed gas was passing through the catalyst bed. The temperature was then incrementally increased in five steps to temperatures of 150° C., 200° C., 250° C., 300° C., and 350° C. Following each increase in temperature, the catalyst bed temperature was maintained at that temperature for at least 10 h while the mixed gas was passing through the catalyst bed.

Figure 1:
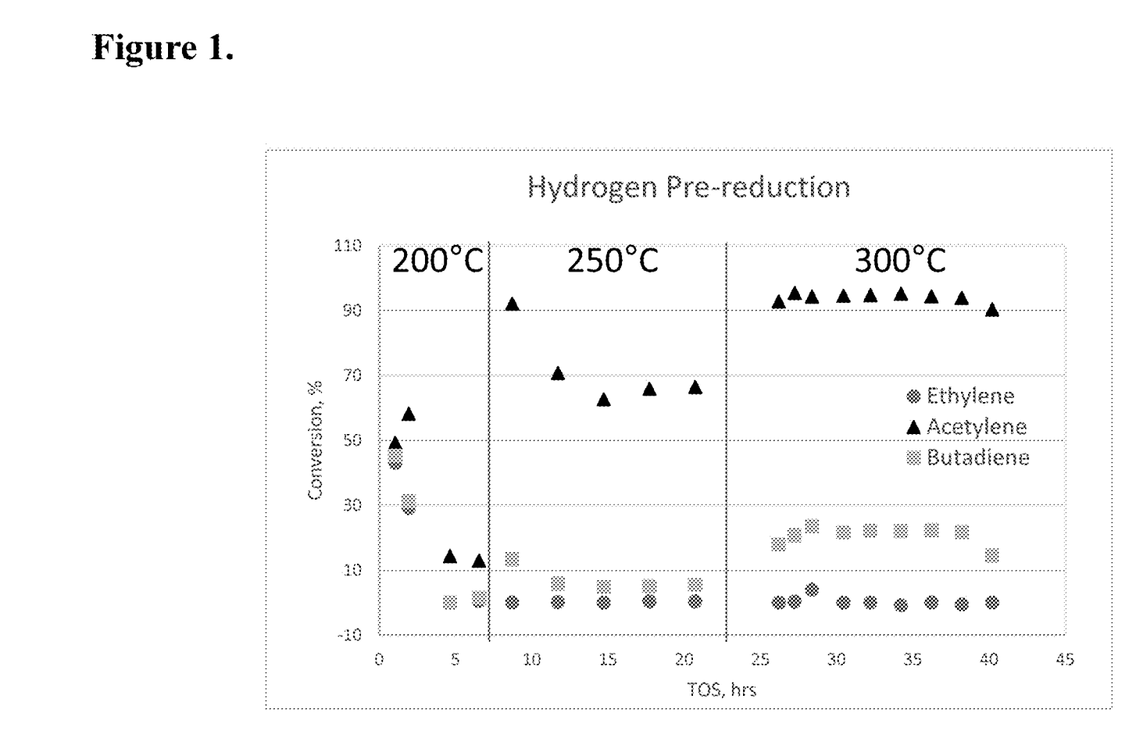
FIG. 1 is a graph depicting percent hydrogenation of acetylene and butadiene by a Ni/Al$_2$O$_3$ catalyst that was first activated by reduction with hydrogen.

FIG. 1 shows the performance of the $Ni/Al_2O_3$ catalyst following pre-reduction of the catalyst for 2 hr in hydrogen. The catalyst exhibited very little activity at 200° C. When the temperature was increased to 250° C., the acetylene conversion jumped to ~65%, but still with very little activity for butadiene removal. Even at 300° C., the butadiene conversion remained low (<25%), despite the acetylene conversion being at ~90%. The catalyst with pre-hydrogen reduction was unable to meet the requirement for butadiene conversion.

Figure 2:
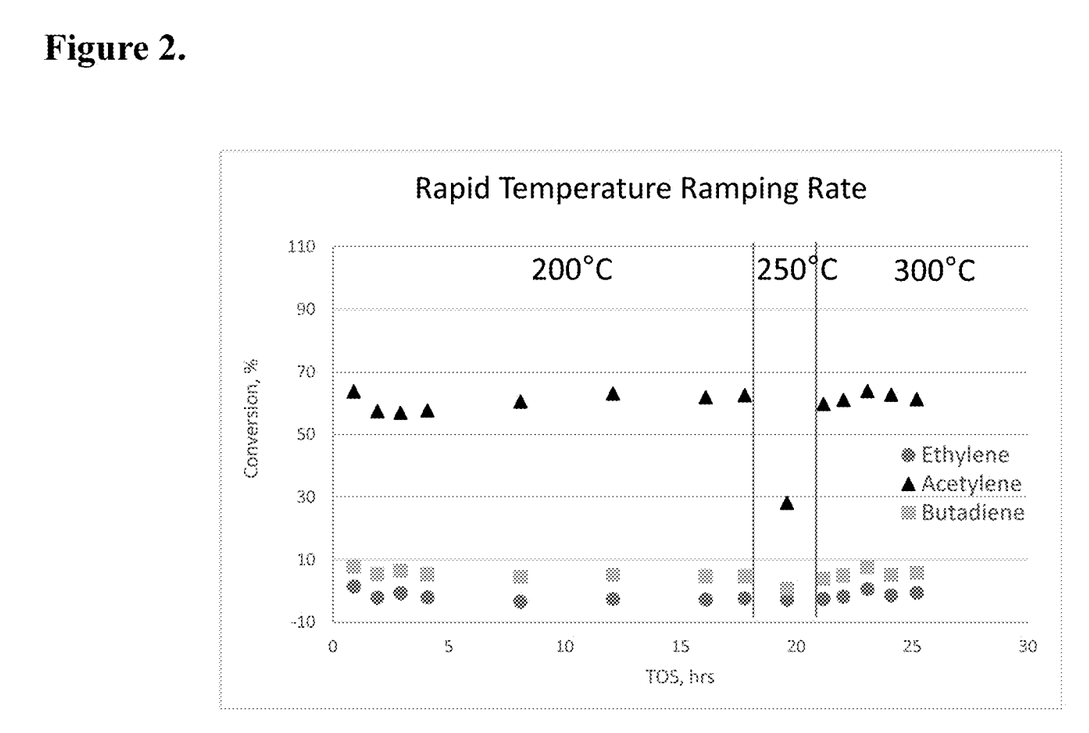
FIG. 2 is a graph depicting percent hydrogenation of acetylene and butadiene by a Ni/Al$_2$O$_3$ catalyst that was first activated by contact with a mixed gas comprising H$_2$S and rapidly ramping the temperature of the mixed gas from 100° C. to 300° C.

FIG. 2 displays the performance of the $Ni/Al_2O_3$ catalyst with the start-up procedure of a rapid-temperature-ramping rate. The catalyst at 250° C. was able to provide only ~28% acetylene conversion with nearly zero butadiene conversion. Increasing the temperature to 300° C. improved acetylene conversion to approximately 60%, but the butadiene conversion was still <10%. This start-up procedure resulted in unsatisfactory catalyst performance.

Figure 3:
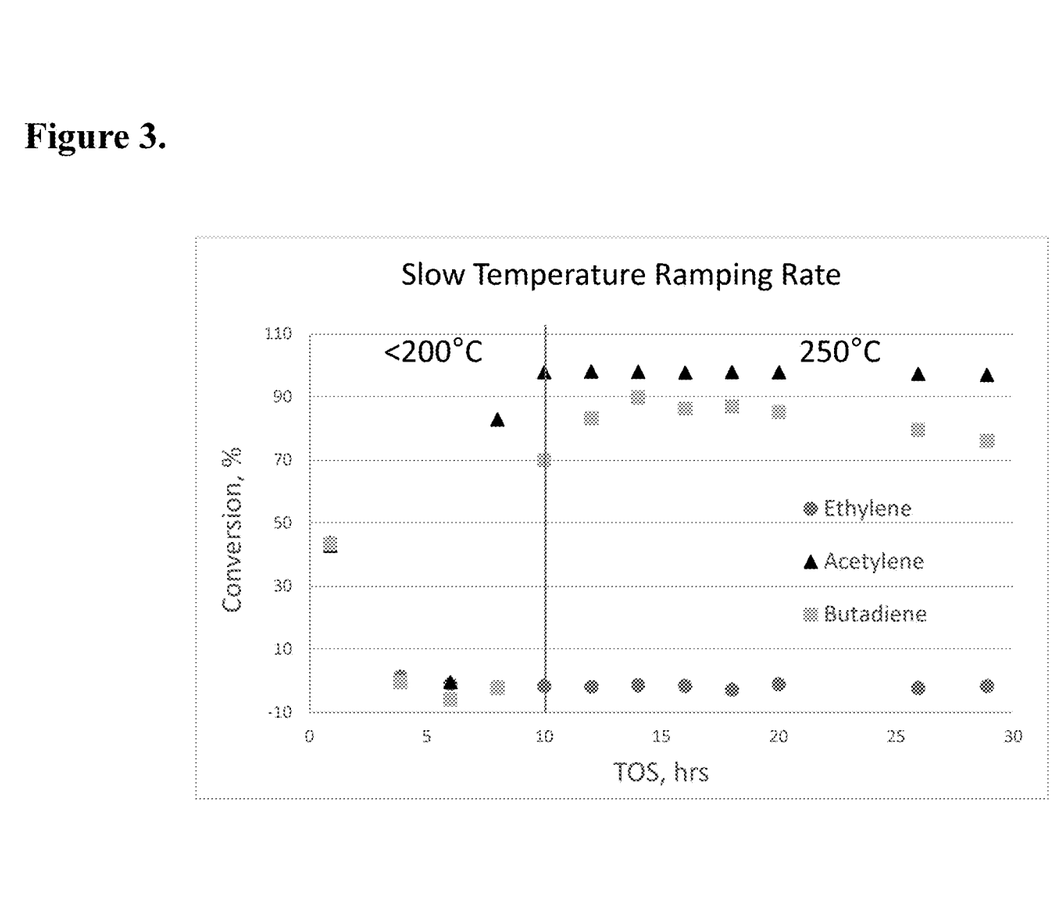
FIG. 3 is a graph depicting percent hydrogenation of acetylene and butadiene by a Ni/Al$_2$O$_3$ catalyst that was first activated by contact with a mixed gas comprising H$_2$S and slowly ramping the temperature of the mixed gas from 100° C. to 250° C.

FIG. 3 presents the performance of the $Ni/Al_2O_3$ catalyst with the start-up procedure of a slow-temperature-ramping rate. In this start-up procedure, the temperature of the incoming mixed gas was increased linearly at 0.5° C./min rate until catalyst bed temperature reached 250° C. The catalyst became active after the temperature exceeded 150° C. At 250° C., the catalyst was able to remove >90% acetylene and approximately 80% butadiene with no noticeable ethylene conversion. This start-up procedure resulted in a much more active catalyst than the two prior start-up procedures (discussed above).

Figure 4:
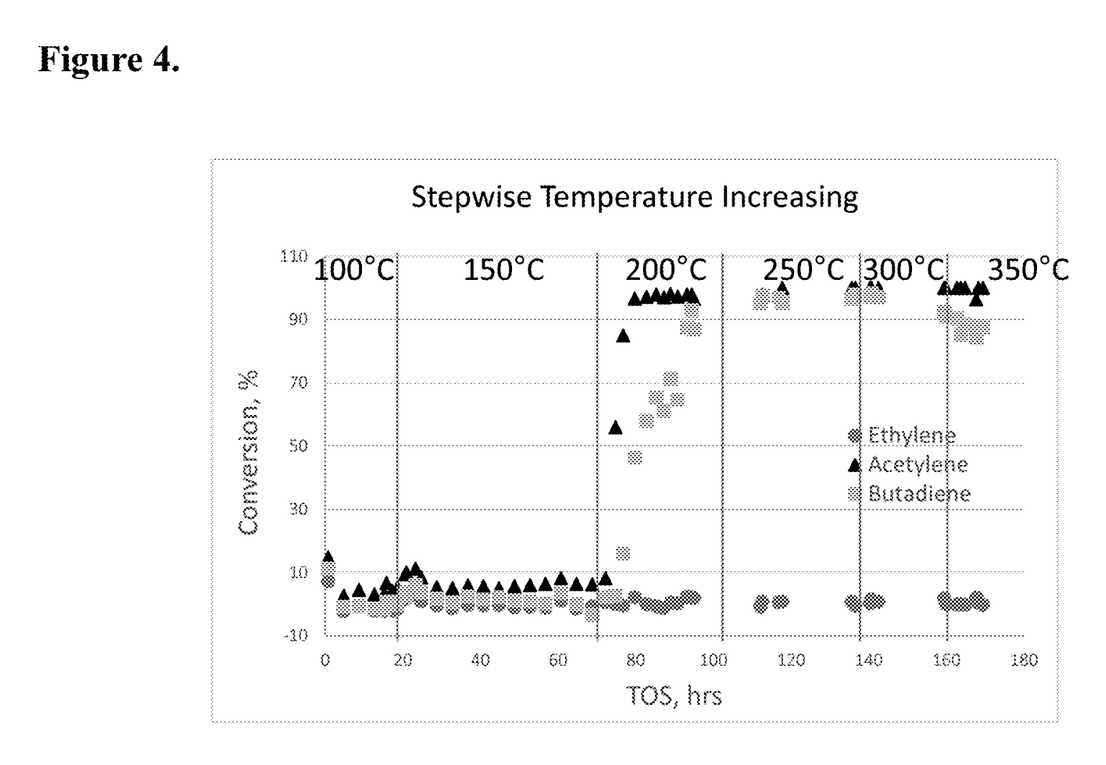
FIG. 4 is a graph depicting percent hydrogenation of acetylene and butadiene by a Ni/Al$_2$O$_3$ catalyst that was first activated by contact with a mixed gas comprising H$_2$S and intermittently increasing the temperature of the mixed gas in 50° C. increments from 100° C. to 350° C. while maintaining each temperature for 10 hr before further increasing the temperature.

FIG. 4 shows the performance of the $Ni/Al_2O_3$ catalyst using a start-up procedure comprising an incremental (or stepwise) increase in the temperature of the mixed gas, beginning with contacting the catalyst with the mixed gas at a 100° C. for 10 hrs. The temperature was then increased in 50° C. increments from 150° C. to 350° C. and following each increase in temperature of the mixed gas, was maintained at that temperature for at least 10 h. The catalyst was inactive for hydrogenating acetylene and butadiene at temperatures up to 150° C. However, at 200° C. the catalyst became active, and the highest acetylene and butadiene conversions (>90% for both) when the catalyst reached 250° C., with no noticeable loss of ethylene. This exceptional performance was maintained as the catalyst bed temperature was increased to 300° C. Increasing temperature further to 350° C. resulted in a slight reduction in butadiene hydrogenation while acetylene hydrogenation remained at >90%, suggesting an optimal catalyst operation window of about 250° C. to 300° C. It appears clear that intermittent temperature increase during catalyst activation in addition to fortuitously contacting the catalyst with the mixed gas during the activation procedure caused an unexpected significant increase in selective hydrogenation activity toward acetylene, but especially butadiene.

The performance of this $Ni/Al_2O_3$ catalyst with these four different start-up procedures are also summarized in Table I.

TABLE 1

Performance of Ni/Al2O3 catalyst for the hydrogenation of acetylene, butadiene, and ethylene following various activation procedures.

| | 250° C. | | 300° C. | |
| --- | --- | --- | --- | --- |
| Catalyst Activation Procedure | Acetylene Conv. (vol. %) | Butadiene Conv. (vol. %) | Acetylene Conv. (vol. %) | Butadiene Conv. (vol. %) |
| Hydrogen Pre-reduction | 66 | 5 | 94 | 23 |
| Rapid Rate Temp. Ramping | 28 | 1 | 63 | 6 |
| Slow Rate Temp. Ramping | 97 | 80 | n/a | n/a |
| Intermittent Temp. Increase | 97 | 94 | 99 | 97 |

Clearly, the choice of catalyst activation procedure had a dramatic effect on catalyst hydrogenation activity towards both acetylene and butadiene. Unexpectedly, the intermittent temperature-increase activation procedure produced the best performance of the catalyst toward hydrogenating more than 90% of both acetylene and butadiene while being highly selective for the hydrogenation of these contaminants relative to the hydrogenation of ethylene. Notably, this intermittent temperature increase catalyst activation was far superior to both: 1) conventional hydrogen pre-reduction procedure or 2) rapid-temperature-ramping activation procedure, which both resulted in inadequate catalyst hydrogenation activity. Without wishing to be bound by theory, we speculate that the unexpectedly improved catalytic activity of this nickel/alumina catalyst for the selective hydrogenation of acetylene and butadiene is probably results from the formation of sulfide-nickel species. This is due to the presence of $H_2S$ in the feed mixture that was inadvertently contacted with the catalyst during the activation procedures that involved either temperature ramping or intermittent temperature increase.

We next considered the potential effect of the solid support material on catalytic activity. A series of nickel-based catalysts were prepared using different support materials, including alumina, silica, titania, zirconia, alumina-silica, and tungstated zirconia. This was done to determine whether choice of support on catalyst performance for the selective hydrogenation of acetylene and butadiene in a raw light olefin stream comprising ethylene, acetylene and butadiene.

Methods for making such catalyst are conventional in nature and thus are not discussed in detail herein. A series of Ni-supported catalysts was prepared by impregnating $(NO_3)_2$ solution onto different supports followed by drying at 120° C. overnight, followed by calcination at 300° C. for 3 h. The nickel loading for each catalyst was targeted for ~1.2 wt %. Six different supports—alumina, silica, titania, zirconia, alumina-silica and tungstated zirconia—were used in the catalyst preparation to form six catalysts, $Ni/Al_2O_3$, $Ni/SiO_2$, $Ni/TiO_2$, $Ni/ZrO_2$, $Ni/Al_2O_3$—$SiO_2$, and $Ni/WZrO_2$.

These catalysts were evaluated for the selective hydrogenation of acetylene and butadiene in the presence of a mixed gas comprising ethylene, ethane, $H_2$, CO, and $H_2S$. The reaction was carried out in a quartz-lined stainless-steel reactor containing 2.5 g of the test catalyst. The reactor was placed in a vertical clamshell furnace equipped with a temperature controller. The mixed gas, containing 39 vol % hydrogen, 35.5 vol % ethylene, 24.5 vol % ethane, 0.5 vol % acetylene, 0.5 vol % butadiene, 50 ppm CO, and 100 ppm $H_2S$, was fed to the reactor at 50 psig, 2.0 $hr^{-1}$ (ethylene).

The catalyst activation was initialized with the temperature of the mixed gas at 100° C. This temperature was held for 10 hr, followed by intermittent increases of 50° C. in the mixed gas temperature. Each temperature was held for 10 hr before increasing the temperature by another 50° C. The final reaction temperature deemed to have been reached when hydrogenation of acetylene and butadiene was >95% or when decreases in the conversion of either acetylene or butadiene conversion was observed after further temperature increases. The reactor effluent gas was continuously analyzed by using an on-line Wasson-ECE Instrumentation refinery gas analyzer to determine the acetylene and butadiene conversion. For each catalyst, a plot of acetylene conversion and butadiene conversion versus reaction temperature was generated. The protocol yielded a conversion versus temperature plot for each catalyst.

Figure 5:
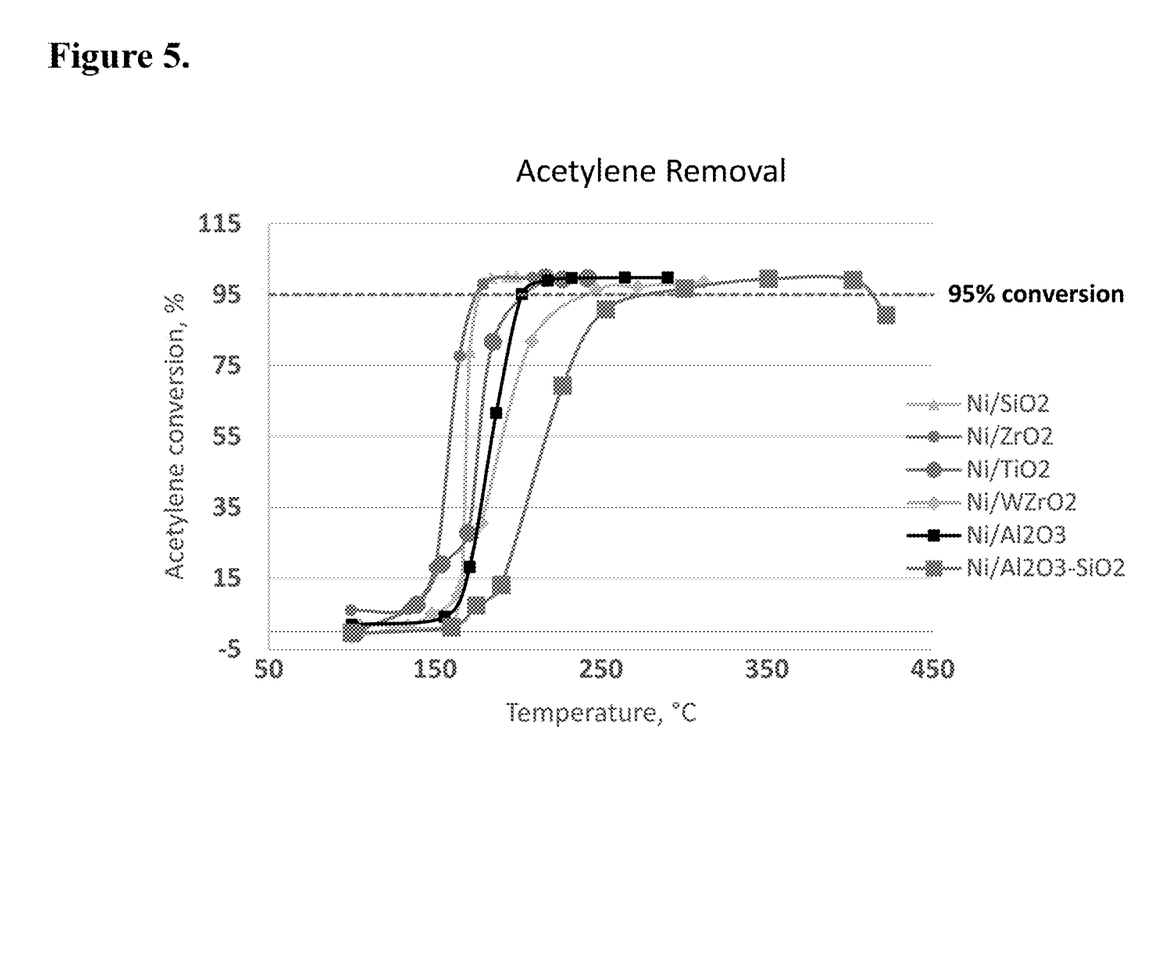
FIG. 5 is a graph depicting percent hydrogenation of acetylene versus temperature by a nickel hydrogenation catalyst supported on any of several different solid supports.
Figure 6:
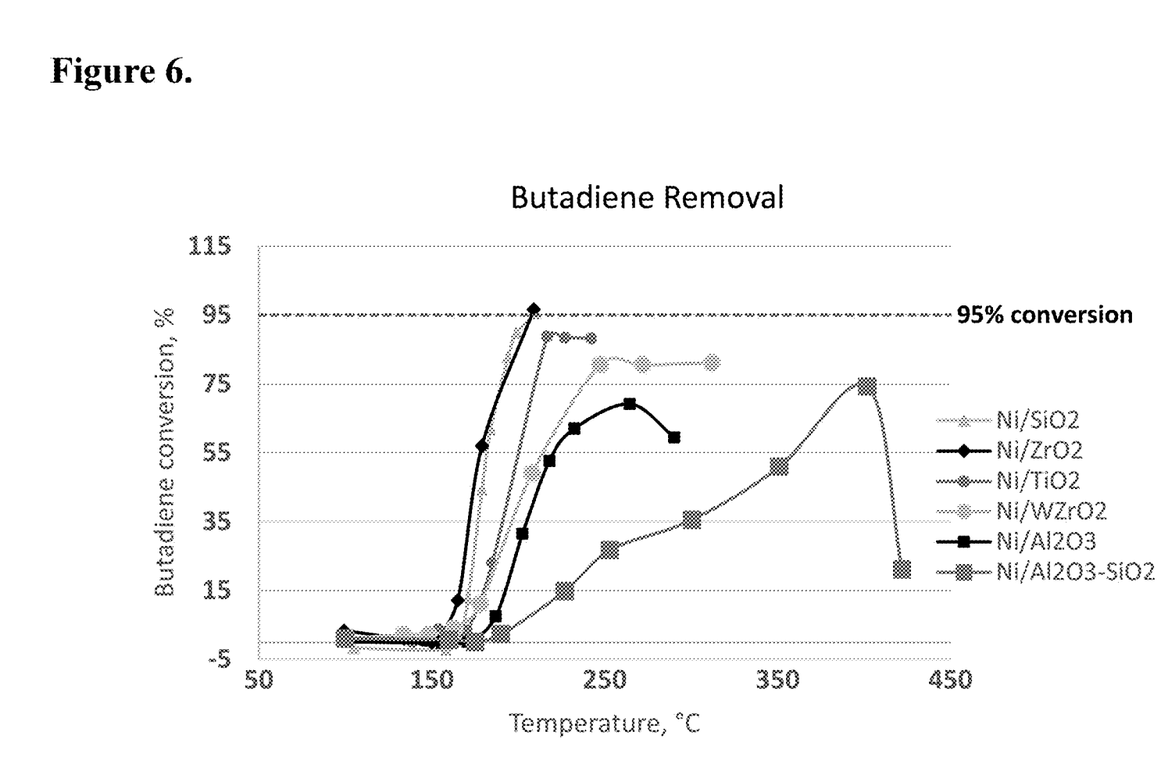
FIG. 6 is a graph depicting percent hydrogenation of butadiene versus temperature by nickel hydrogenation catalysts supported any of several different solid supports.

FIG. 5 compares the catalyst performance for the selective hydrogenation of acetylene. Very little acetylene conversion was observed below 150° C. for all catalysts. With the step-wise temperature increase protocol, all catalysts tested eventually reached greater than 95 vol. % acetylene conversion. Nevertheless, the temperature required for each catalyst to perform at that level was quite different. For example, the $Ni/ZrO_2$ achieved 95 vol. % acetylene conversion at a temperature as low as 170° C., while the $Ni/Al_2O_3$, $Ni/SiO_2$ required 275° C. to exceed 95 vol. % acetylene conversion. This indicated that the $Ni/ZrO_2$ catalyst can be operated at a temperature that is approximately 100° C. lower than that required for the $Ni/Al_2O_3$—$SiO_2$ catalyst. The order of reaction temperature required to achieve 95 vol. % acetylene conversion is shown below: $Ni/ZrO_2 \approx Ni/SiO_2 \leq Ni/TiO_2 \approx Ni/Al_2O_3 \leq Ni/WZrO_2 \leq Ni/Al_2O_3$—$SiO_2$ FIG. 6 compares the catalyst performance for the selective hydrogenation of butadiene. At a reaction temperature below 150° C., no catalyst was active for the hydrogenation of butadiene. As the reaction temperature increased gradually, these catalysts started to display butadiene-selective hydrogenation activity, but with a lower activity than for acetylene-selective hydrogenation at the same reaction temperature. This is because that butadiene is less reactive than acetylene for the hydrogenation reaction. Only two of the six catalysts ($Ni/ZrO_2$ and $Ni/SiO_2$) were able to surpass the 95% butadiene conversion level. The other four catalysts were unable to reach 95% butadiene conversion even with continuously increasing reaction temperature beyond 250° C. In fact, as the reaction temperature increased initially, the butadiene conversion increased accordingly. After reaching maxima in conversion, further increases in reaction temperature led to a decrease in butadiene conversion, presumably due to catalyst sintering at higher reaction temperatures. The $Ni/Al_2O_3$—$SiO_2$ catalyst performed significantly worse than the other catalysts. As with the acetylene-conversion case, it appeared that the low-acidity supports were the more preferred supports for the butadiene conversion.

Figure 7:
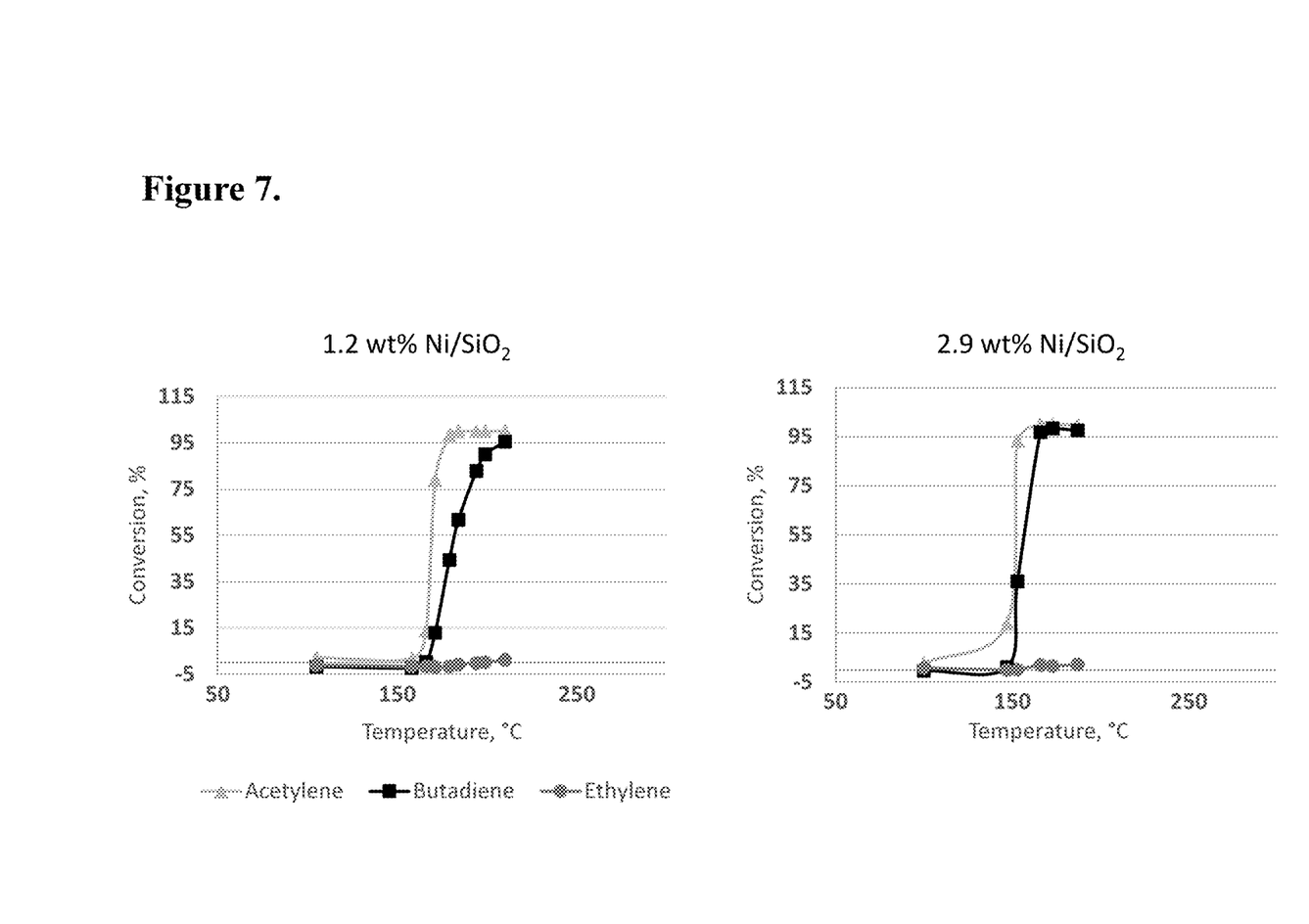
FIG. 7 is a graph depicting percent hydrogenation of acetylene and butadiene by a Ni/SiO$_2$ catalyst loaded with 1.2 wt. % nickel, and 2.9 wt. % nickel, respectively.

We next examined the potential effect of nickel loading on catalytic activity of the selective hydrogenation catalyst. A $SiO_2$ support was utilized since our prior data determined that this support material was well-suited to producing a selective hydrogenation catalyst that is highly-selective for the hydrogenation of acetylene and butadiene when using the stepwise activation process of the present disclosure. Two catalysts were prepared using a $SiO_2$ support and different nickel loading percentages (1.2 wt. % and 2.9 wt. %) to examine the potential effect of nickel loading on catalytic activity. The resulting plots of acetylene and butadiene conversions versus reaction temperatures are shown in FIG. 7. The catalysts had similar activity profiles in relation to reaction temperature and both were able to reach acetylene and butadiene conversions of >95 vol. %. However, the $Ni/SiO_2$ catalyst loaded with 2.9 wt. % Ni catalyzed selective hydrogenation of more than 90 vol. % of acetylene and butadiene at a slightly lower reaction temperature than the 1.2 wt % $Ni/SiO_2$ catalyst, suggesting that higher nickel loading could reduce the reaction temperature required to eliminate these contaminants. Importantly, the hydrogenation activity of ethylene to ethane was negligible at ether nickel loading percentage (FIG. 7), which is an important requirement for the inventive catalyst.

The experimental results discussed above indicate that out of these six catalysts studied, the $Al_2O_3$—$SiO_2$ support resulted in the worst performing catalyst, especially for butadiene conversion. Catalysts made from three non-acidic supports, $ZrO_2$, $SiO_2$, and $TiO_2$, showed the best performance. The performances of catalysts made from $Al_2O_3$ and $WZrO_2$ supports were between those of the best and worst groups. While not wishing to be bound by theory, the relative activity of the various catalysts suggests an inverse correlation with acidity of the support. Those catalysts that required higher temperature to achieve the same level of acetylene hydrogenation were likely hindered by a support having relative high acidity. The $Al_2O_3$—$SiO_2$ support is well known to be acidic. $WZrO_2$ also contains some Brønsted and Lewis acid sites. These results suggest that the presence of acid sites on the support may be detrimental to the selective hydrogenation of acetylene and butadiene, probably because of the interaction between the acid site and nickel.

Figure 8:
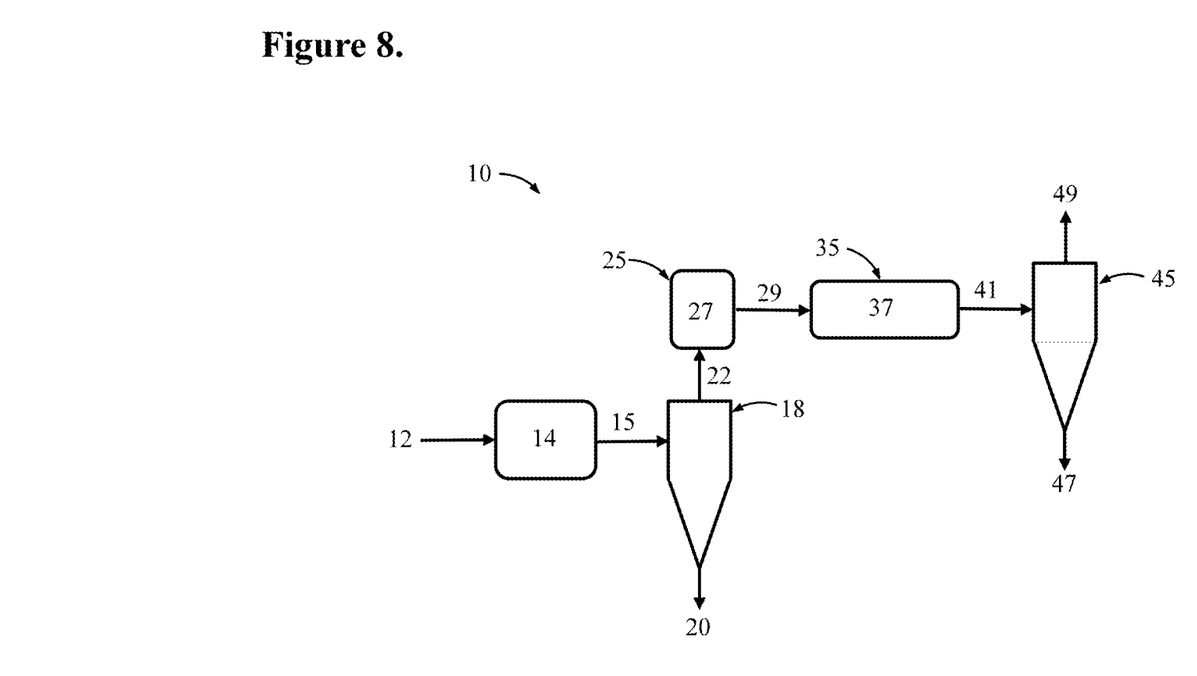
FIG. 8 is a schematic diagram depicting a process and system for converting a light alkane stream to produce a liquid transportation fuel (or a blend-component thereof), including a step for efficiently hydrogenating acetylene and butadiene from a raw cracked olefins stream using a modified nickel catalyst.

A first embodiment of a light alkanes conversion process using the inventive catalyst described herein is depicted in the flow diagram of FIG. 8, It is noted that the inventive features and concepts described herein may be manifested in arrangements other than those depicted and that the scope of the inventive disclosure is not intended to be limited to embodiment that are specifically described or illustrated.

FIG. 8 depicts a light alkanes conversion process 10 depicting components used to convert a light alkanes stream to liquid transportation fuels (or a blend-component thereof). The process may convert an ethane stream any other NGL fraction including a Y-grade NGL stream that comprises C2-C7 hydrocarbons (predominantly C2-C5 hydrocarbons). A light alkanes stream 12 may be fed directly into a thermal cracking unit 14 that is operable to produce a cracked effluent 15 that exits the thermal cracking unit 14 and is delivered directly into a first separation unit 18. First separation unit 18 selectively condenses C5 and larger hydrocarbons to produce a pyrolysis gasoline stream 20 and a raw light olefins stream 22 comprising hydrogen, methane, unconverted ethane, ethylene, acetylene, propane, propylene, butadiene and other residual gaseous products.

The raw light olefin stream 22 is fed to contaminant removal reactor 25 containing at least one contaminant removal catalyst 27 that selectively hydrogenates at least 95 wt % of both the butadiene and acetylene in the raw light olefin stream 22 while not hydrogenating more than 3 wt % of the ethylene in the raw light olefin stream. Via selective hydrogenation, the contaminant removal catalyst 27 decreases the concentrations of both acetylene and butadiene in the raw light olefin stream 27 to produce a cleaned raw light olefin stream 29. In certain embodiments, the contaminant removal catalyst 27 comprises nickel. In certain embodiments, the contaminant removal catalyst selectively hydrogenates at least 95 wt % of the acetylene and 95 wt % of the butadiene present the raw light olefin stream while decreasing the overall concentration of other olefins (such as ethylene) present in the raw light olefin stream 22 by less than 3 wt %; optionally, by less than 2 wt %; optionally, by less than 1 wt %.

Cleaned raw light olefin stream 29 leaves the contaminant removal reactor 25 and enters an oligomerization reactor 35 that contains an oligomerization catalyst 37 that may be a zeolite. Hydrogenation of both acetylene and butadiene from the raw light olefin stream 22 prevents these contaminants from contacting and prematurely deactivating the oligomerization catalyst 37.

Cleaned raw light olefin stream 29 contacts the oligomerization catalyst 37 at a temperature and pressure that facilitates the oligomerization of light olefins to produce an oligomerization effluent 41 comprising larger hydrocarbons that can be used as a liquid transportation fuel, or a blend stock thereof. Oligomerization effluent 41 enters a second separation unit 45 which is operable to produce a liquid hydrocarbon stream 47 that comprises a liquid transportation fuel or blend component thereof and an off-gas stream 49 comprising unreacted C2-C4 olefins, C2-C4 alkanes, hydrogen and residual light gases.

Another advantage of light alkanes conversion process 10 is that it is not bound to any particular catalyst system. In other words, numerous catalyst options exist and may be utilized in the second stage of light alkanes conversion process 10. The second stage of light alkanes conversion process 10 is a reactor (i.e. oligomerization unit 28) that upgrades the intermediate product produced from the first cracking stage to produce clean fuels. This is a unique process in and of itself within light alkanes conversion process 10. Another potentially unique feature is that the first stage may be configured to not utilize regeneration (i.e. intermittent oxidative treatments to recover catalyst activity).

Speaking generally, the oligomerization catalyst is a zeolite catalyst that is known to be adversely affected by the presence of concentrations greater than 0.5 vol. % acetylene and/or butadiene in the stream that enters the oligomerization reactor. In certain embodiments, the zeolite catalyst is a ZSM-5 zeolite catalyst. This catalyst is known to function effectively to convert light olefins to larger hydrocarbons that can be used as a blend component of a liquid transportation fuel (e.g., gasoline or diesel fuel).

Although the systems and processes described herein have been described in detail, it is intended that various changes, substitutions, and alterations can be made without departing from the spirit and scope of the invention as defined by the following claims. The abstract and drawings should not be interpreted as limiting the scope of the invention that is defined by the claims.

The invention claimed is:

1. A process to activate a hydrogenation catalyst to produce a selective hydrogenation catalyst, comprising:
    a) contacting a hydrogenation catalyst comprising nickel with a mixed gas comprising hydrogen and hydrogen sulfide at a first temperature that is in the range from 0° C. to 100° C. in a first reaction zone for at least 1 hr,
    b) increasing the temperature of the mixed gas to a second temperature that is at least 25° C. greater than the first temperature and contacting the hydrogenation catalyst with the mixed gas at the second temperature for at least 1 hr,
    c) repeating part b) for a quantity of iterations in the range from two to twelve to produce a modified hydrogenation catalyst having an increased selectivity for the hydrogenation for both acetylene and butadiene and a decreased selectivity for the hydrogenation of ethylene.

2. The process of claim 1, wherein the modified hydrogenation catalyst comprises nickel supported on silica or zirconia.

3. The process of claim 1, wherein the modified hydrogenation catalyst comprises nickel at a loading that is in a range from 0.5 wt. % to 3 wt. %.

4. The process of claim 1, wherein the hydrogen sulfide is present in the mixed gas at a concentration that is in a range from 10 ppm to 1000 ppm.

5. The process of claim 1, wherein the hydrogen sulfide is present in the mixed gas at a concentration of at least 100 ppm.

6. The process of claim 1, wherein the mixed gas flows through the reaction zone at a flow rate of at least 0.5 hr$^{-1}$ (WHSV).

7. The process of claim 1, wherein the mixed gas flows through the reaction zone at a flow rate of at least 1 hr$^{-1}$ (WHSV).

8. The process of claim 1, wherein the maximum temperature of the heated mixed gas during the contacting does not exceed 350° C.

9. The process of claim 1, wherein during the contacting, the heated mixed gas is maintained for at least one hour at a quantity of distinct temperatures that is in a range from four to twelve, with at least 25° C. separating each distinct temperature.

10. The process of claim 9, wherein during the contacting, the heated mixed gas is maintained at each distinct temperature for at least 10 hours.

11. The process of claim 1, wherein the mixed gas further comprises at least 35 vol. % hydrogen, at least 50 vol. % C1-C3 olefins and C1-C3 alkanes and at least 50 ppm of carbon monoxide.

12. A modified hydrogenation catalyst produced by the process of claim 1.

13. The modified hydrogenation catalyst of claim 12, wherein the modified hydrogenation catalyst is operable to hydrogenate at least 90 mol % of both acetylene and butadiene at temperature of at least 170° C. when contacted with a mixed gas comprising 0.5 wt. % acetylene, 0.5 wt. % butadiene and 35.5 wt. % ethylene at a flow rate of 1.0 $hr^{-1}$ WHSV, wherein the modified hydrogenation catalyst is further operable to hydrogenate less than 3 wt. % of the ethylene in the mixed gas a temperature of at least 170° C.

14. A process for upgrading light olefins to a transportation fuel or blend component thereof using the modified hydrogenation catalyst of claim 1, comprising:
  a) directing a raw light olefin stream comprising hydrogen, ethylene, acetylene, and butadiene to a first reactor containing the modified hydrogenation catalyst and contacting the raw light olefin stream with the modified hydrogenation catalyst in the first reactor, wherein the first reactor maintains the raw light olefin stream at a temperature and a pressure that facilitates hydrogenation of over 90 vol. % of the acetylene and at least 90 vol. % of the butadiene present in the raw light olefin stream by the modified hydrogenation catalyst while simultaneously facilitating the hydrogenation less than 3 vol. % of the ethylene present in the raw light olefin stream by the modified hydrogenation catalyst, thereby producing a modified light olefin stream;
  b) contacting the modified light olefin stream with an oligomerization catalyst in a second reactor at a temperature and a pressure that facilitates catalytic conversion of the modified light olefin stream by the oligomerization catalyst to produce a liquid transportation fuel or blend component thereof and an off-gas stream comprising unreacted C2-C4 olefins, C1-C4 alkanes and hydrogen.

15. The process of claim 14, further comprising directing at least one of an ethane stream and a Y-grade stream comprising C2-C7 light alkanes into a thermal cracking unit to produce the raw light olefin stream of claim 14.

16. The process of claim 14, further comprising separating a pyrolysis gasoline fraction comprising hydrocarbons containing at least five carbon atoms from the raw light olefin stream prior to directing an uncondensed remainder of the raw light olefin stream to the first reactor.

* * * * *